June 10, 1930. G. E. BEHNKE 1,762,570
ROLLER CUTTER MOUNTING
Filed March 28, 1927

INVENTOR.
*Guy E. Behnke.*
BY
*J. Vincent Martin*
ATTORNEY

Patented June 10, 1930.

1,762,570

UNITED STATES PATENT OFFICE

GUY E. BEHNKE, OF HOUSTON, TEXAS, ASSIGNOR TO REED ROLLER BIT COMPANY, OF HOUSTON, TEXAS, A CORPORATION OF TEXAS

ROLLER-CUTTER MOUNTING

Application filed March 28, 1927. Serial No. 179,022.

This invention relates to rotary boring drills, and more particularly to bits of the roller cutter type.

The object of the invention is to provide means whereby a roller cutter and its spindle can be quickly and securely mounted in and removed from the head of a bit, without changing the position of any other element of the bit.

Another object is to provide new and improved means whereby the full force of cleaning water may be utilized.

Various other objects of the invention will be apparent from the following description.

Figures 1, 2:
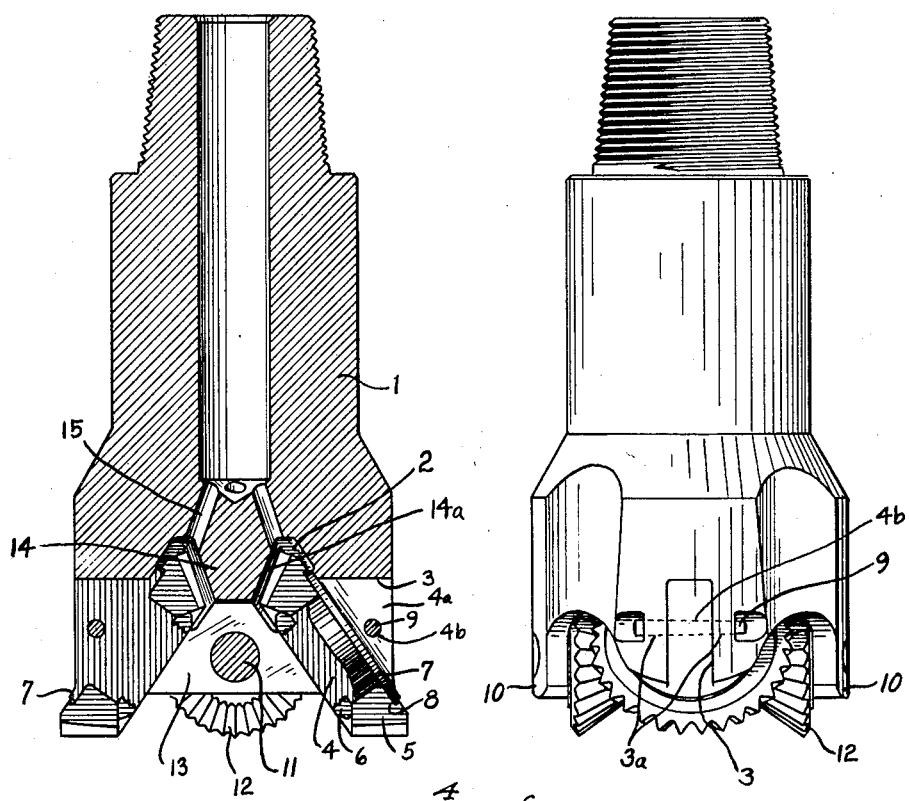
Figure 3:
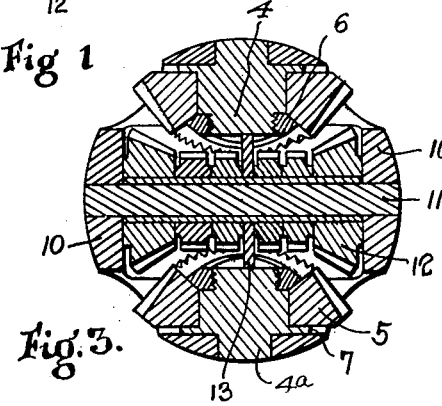

In the accompanying drawings, illustrative of the preferred embodiment of the invention, Fig. 1 is a sectional elevation of the bit head, and Fig. 2 is a side elevation thereof; and Fig. 3 is a bottom plan sectional view.

Referring specifically to the drawings, the bit head is illustrated at 1, and is provided with a recess in the bottom thereof defined by upwardly and inwardly inclined walls 2. Walls 2 are slotted as shown at 3. Alined bores 3ª extend outwardly from slot 3 through head 1. Spindle 4 has a flat extension 4ª fitting in slot 3, said extension being provided with a bore 4ᵇ. Frusto-conical cutter 5 is held on spindle 4 by ring nut 6. Spindle 4 is also provided with an annular flange 7, which rests upon inclined face 2 of head 1, and in annular groove 8 of cutter 5. The extension 4ª is held in slot 3 by pin or bolt 9 passing through bores 3ª and bore 4ᵇ.

Head 1 is also provided with depending portions 10 to form supports for cross roller cutter pin 11, pin 11 having a plurality of cross roller cutters 12 mounted thereon, and carrying at or adjacent the longitudinal axis of the head a bridge 13. Head 1 has a depending projection 14 immediately above and in contact with bridge 13.

Water courses 15 discharge from head 1 into the space between the outer walls of projection 14 and walls 2, and impinges upon the periphery of side roller cutters 5.

From the foregoing description, the ease with which the parts may be assembled and the many advantages thereof, will at once be apparent to those skilled in the art. The assembly and advantages may, however, be briefly referred to as follows:

Pin 11 carrying cross roller cutters 12 and bridge 13 having been mounted in depending portions 10 of head 1, spindle 4 having cutter 5 mounted thereon, is inserted inwardly and upwardly into the head and between bridge 13 and wall 2, flat extension 5 entering slot 3. Pin or bolt 9 is then inserted through bores 3ª and bore 4ᵇ to prevent the dropping out of spindle 4.

Spindle 4 with cutter 5 mounted thereon is taken from the head simply by removing bolt 9 and slipping the spindle and cutter outwardly and downwardly.

By the means described, when a side roller cutter becomes worn, it can quickly be replaced by knocking out a single pin, slipping the spindle with the worn cutter thereon out of the head, removing the ring nut, slipping the worn cutter off the spindle, putting a new cutter thereon and replacing the ring nut, slipping the spindle with the new cutter thereon into the head, and replacing the pin. Thus the cutter mounted upon its spindle may be inserted in and removed from the head without removal of any other element of the bit.

In deep well drilling, the greatest pressure upon the elements of a bit head is ordinarily exerted vertically. Such pressure will serve to hold spindles 4 firmly in place. Pin 9, however, prevents the spindle from coming out of the head, in the absence of such pressure, that is, when the bit is being lowered or removed from the hole, or is not in use. Means to hold the spindle in place, other than pin 9 could, of course, be substituted without departure from the invention.

It is to be noted that depending projection 14 has inwardly and downwardly extending surfaces 14ª, in a plane substantially parallel to the plane of the teeth on cutter 5. Water issuing from courses 15 is thereby made to impinge directly upon said teeth to keep the same clean.

Depending projection 14 also engages bridge 13 to steady the same, and thus provide a support to take upward thrust on pin 11.

Various changes may be made within the scope of the following claims.

I claim:

1. A bit comprising a head having a recess therein, side roller cutters mounted in said recess, a pin extending transversely of said head between said side roller cutters and having cross roller cutters and a bridge mounted thereon, said side roller cutters being mounted on spindles slidable between and supported by the wall of said recess and the bridge, and being slidable laterally into and out of said recess while the cross roller elements are mounted in said recess, and means to secure said spindles in said head.

2. A bit comprising a head having a central recess and slots in the side walls thereof, cross roller cutters and side roller cutters in said recess, and spindles upon which said side roller cutters are mounted, said spindles being slidable laterally in said slots, whereby said side roller cutters can be inserted in and removed from said recess while said cross roller cutters are mounted in said recess.

3. A bit comprising a head having a recess and slots therein, a pin extending transversely across said recess, cross roller cutters on said pin, a bridge on said pin, spindles slidable laterally in said slots, and adapted to be supported by said bridge and the wall of said recess, and side roller cutters on said spindles.

4. In a rotary boring drill, a head having a recess in the bottom thereof defined by upwardly and inwardly inclined surfaces and slots leading from said surfaces, the upper wall of each of said slots extending at substantially a right angle to the vertical axis of said head, a pin in said recess, cross roller cutters on said pin, a wedge-shaped bridge on said pin, spindles slidable laterally in said slots and shaped to engage said walls and said bridge, and side roller cutters on said spindles.

In testimony whereof, I have hereunto affixed my signature.

GUY E. BEHNKE.